Van Tassell & Pollock,
Sad Iron,
№ 99,265. Patented Jan. 25, 1870.
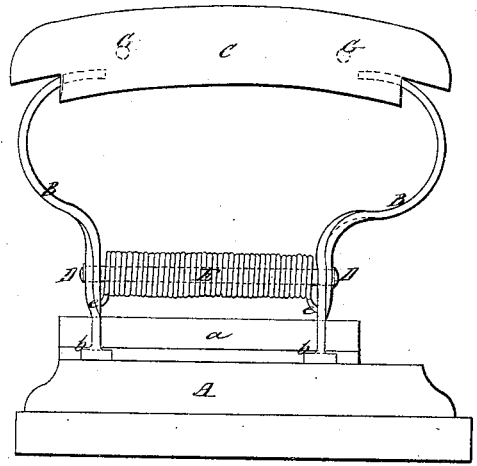
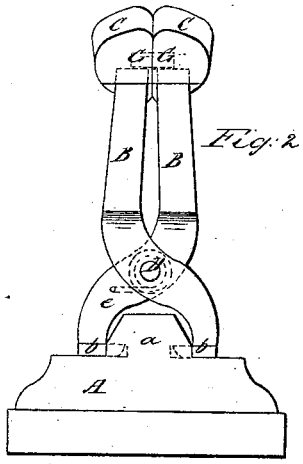 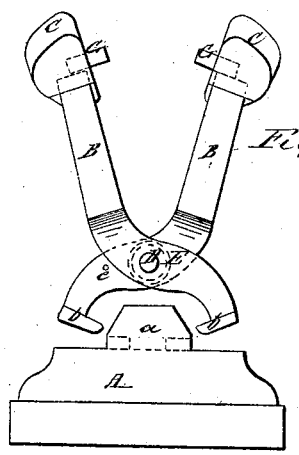
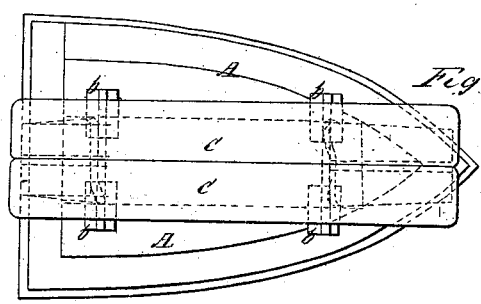
Witnesses
Geo. Pardy
James L. Drunc
Inventor
Theodore Van Tassell
R. Starr Pollock

United States Patent Office.

THEODORE VAN TASSELL AND RICHARD STARR POLLOCK, OF SAN FRANCISCO, CALIFORNIA.

Letters Patent No. 99,265, dated January 25, 1870.

IMPROVED SMOOTHING-IRON HANDLE.

The Schedule referred to in these Letters Patent and making part of the same.

*To all whom it may concern:*

Be it known that we, THEODORE VAN TASSELL and RICHARD STARR POLLOCK, both of the city and county of San Francisco, and State of California, have invented a certain new and improved "Removable Handle for Smoothing-Irons;" and we do hereby declare that the following is a full, clear, and exact description of the same, reference being had to the accompanying drawings, making a part of this specification, in which—

Figure 1 is a side view;

Figure 2 is an end view, with handle set in position;

Figure 3 is an end view, showing the handle opened and detached; and

Figure 4 is a plan or top view of our device.

Our invention is intended to obviate, in a simple and effective manner, the difficulty experienced in operating with heated smoothing-irons, which have handles solid with the heater-block, which become heated to an extent as to require that a shield or holder should be used, to prevent burning the hand of the operator.

Our improved removable handle is detached from the heater-block when it is being heated, and will only be brought in contact therewith during the time of actual operation; hence, it will necessarily remain cool, and may be held without inconvenience by the operator.

The substance of which the handle proper is made will be comparatively a non-conductor of heat, as wood, &c.

To enable others skilled in the art to make and use our invention, we will proceed to describe its construction and operation as follows:

The heater-block A will be of ordinary shape, and of various sizes, as may be required to complete sets of, say, six, more or less, and to each one of these sets the removable handle will be made to accommodate itself, so that but one handle will be required to each set.

The removable handle, entire, will be formed by connecting two separate clamps or nippers B B by a wooden handle, C, made in halves, as shown in figs. 2, 3, and 4, and also by the brace-rod D, which forms the pivot, upon which the nippers vibrate.

The clamps or nippers are peculiarly formed, in manner as shown in fig. 1 of the drawing, being shaped like the solid handle in common use, to accommodate the hand of the operator.

The nippers are sprung together by the action of the spiral spring E, which is wound around the brace-rod D, the ends of the spring being secured to the opposing sides of the nippers, as at *e*.

At the bottom of the legs of the clamps or nippers, will be provided small projections or feet *b*, which will insert themselves into cavities or slots formed in the rib or projection *a*, cast on top of the heater-block.

The metal portion of the handle may be cast malleable iron, and the spring may be of iron, steel, or brass.

In the wooden part of the handle there will be a couple of pins, G, provided in one-half of the handle, which will insert themselves into sockets or holes, drilled to receive them, in the opposite half, as shown in all the figures of the drawings. This is to give firmness and rigidity to the handle, that it may not become loose.

The operation is simple and as follows:

When the heater-block is being heated, the handle is removed, and when it is desired, the handle is applied to the iron by opening the nippers, as in fig. 3, and by inserting the projections or feet *b*, on the bottom of the nippers, into the holes made to receive them, and by allowing the handle to close, by the action of the spring, a solid hold may be had on the heater-block, sufficient for the purposes required.

We will here state that we are aware of many removable handles for smoothing-irons having been used before, but know of none similar to this of our invention, and possessing equal advantages therewith.

What we claim as our invention, and desire to secure by Letters Patent, is as follows:

The removable handle, formed by the two clamps or nippers B B, and connected by the wooden pieces C C and rod D, acted on by the spiral spring E, in combination with the slotted holes, provided in the heater-block, constructed in the manner substantially as described, and for the purposes as set forth.

THEODORE VAN TASSELL.
R. STARR POLLOCK.

Witnesses:
GEO. PARDY,
JAMES L. DRUM.